US006901476B2

(12) United States Patent
Stark et al.

(10) Patent No.: US 6,901,476 B2
(45) Date of Patent: *May 31, 2005

(54) VARIABLE KEY TYPE SEARCH ENGINE AND METHOD THEREFOR

(75) Inventors: Moshe Stark, Even Yehuda (IL); Guy Itzkovsky, Ramat-Hasharon (IL); Shay Kastoriano, Moshav Rinatia (IL); Yoram Stern, Raanana (IL); Eran Saltzmann, Tel-Aviv (IL); Eyal Shachrai, Netanya (IL)

(73) Assignee: HyWire Ltd., Netanya (IL)

( * ) Notice: Subject to any disclaimer, the term of this patent is extended or adjusted under 35 U.S.C. 154(b) by 431 days.

This patent is subject to a terminal disclaimer.

(21) Appl. No.: 10/138,580

(22) Filed: May 6, 2002

(65) Prior Publication Data
US 2003/0208657 A1 Nov. 6, 2003

(51) Int. Cl.⁷ .............................. G06F 12/00
(52) U.S. Cl. ............... 711/108; 711/128; 707/2; 707/201; 365/49
(58) Field of Search ............... 711/108, 128; 365/49; 707/2, 201

(56) References Cited

U.S. PATENT DOCUMENTS

| | | | | |
|---|---|---|---|---|
| 5,222,222 A | * | 6/1993 | Mehring et al. | 711/207 |
| 5,659,714 A | * | 8/1997 | Yoshida | 711/211 |
| 6,237,061 B1 | * | 5/2001 | Srinivasan et al. | 711/108 |
| 6,389,507 B1 | * | 5/2002 | Sherman | 711/108 |
| 6,415,279 B1 | * | 7/2002 | Gard et al. | 707/2 |
| 6,606,681 B1 | * | 8/2003 | Uzun | 711/108 |
| 6,757,780 B2 | * | 6/2004 | Stark | 711/108 |
| 2003/0093646 A1 | * | 5/2003 | Stark | 711/219 |
| 2003/0131187 A1 | * | 7/2003 | Stark | 711/108 |

FOREIGN PATENT DOCUMENTS

| | | |
|---|---|---|
| WO | PCT/IL01/01025 | 11/2001 |
| WO | WO01/91132 | 11/2001 |

OTHER PUBLICATIONS

U.S. Appl. No. 09/779,941, Stark.

* cited by examiner

Primary Examiner—Matthew Kim
Assistant Examiner—Hetul Patel
(74) Attorney, Agent, or Firm—Mark M Friedman

(57) ABSTRACT

A system and method for storing arranged data in a memory, and for extracting the data therefrom, the system including: (a) a random access memory (RAM) including: (i) a first array of cells, the first array having at least two dimensions and having rows and columns, the first array designed and configured to contain a plurality of at least two kinds of key entries, each of the cells having a unique address and being accessible via an input key, each of the kinds of key entries being arranged in monotonic order, and (ii) a second array of cells, the second array having at least two dimensions and having rows and columns, the second array having a plurality of data entries, each of the data entries being associated with a particular one of the key entries, and (b) processing means designed and configured to search, in response to the input key, the plurality of key entries so as to identify a match.

37 Claims, 10 Drawing Sheets

VARIABLE KEY TYPE SEARCH ENGINE AND METHOD THEREFOR

FIELD AND BACKGROUND OF THE INVENTION

The present invention relates to a variable-key type search device for, and variable-key type search method of, implementing a Random Access Memory (RAM)-Based Binary CAM and a RAM-Based Range Content Addressable Memory (RCAM).

Conventional memory arrays such as Random Access Memories (RAMs) store and retrieve data units indexed by their respective addresses.

Content Addressable Memories (CAMs) are associative memories that contain key entries and associated data entries that uniquely correspond to the key entries. A CAM stores the key entries and the associated data entries at any available location and retrieves the associated data for any key that is submitted to be searched in the CAM.

A binary CAM stores an ordered list of single integer key entries and a corresponding list of their associated data. An RCAM stores instead a list of key entries that represent range boundaries and a list of associated data that correspond uniquely to these ranges. A key search in a binary CAM results in an exact match, whereas a key search in an RCAM matches an entire range. The RCAM also stores a list of associated boundary type entries that determine the validity of the corresponding ranges. This list can be stored in conjunction with the list of associated data or in a separate array.

A successful approach to utilizing RAM-based technology on a binary CAM is provided in a co-pending, unpublished (and as such, is not to be construed as prior art with regard to the present application) PCT Patent Application Serial No. IL01/00458, which is incorporated by reference for all purposes as if fully set forth herein. A method and apparatus are disclosed therein for the high-rate arrangement, storage and extraction of data in a two-dimensional memory array. The two-dimensional array, which consists of memory cells, is arranged in rows and columns. Each of the key entries in these cells has a unique pair of indices that indicate the key entry location in the array. The associated data entries corresponding to these key entries are stored in another two-dimensional array under the same pair of indices. When a submitted key is searched and found, the associated data is retrieved from the corresponding cell in the other two-dimensional associated-data associated data entry to indicate whether the associated data is valid or not. The key entries in the two-dimensional array are arranged in monotonic order. The entries are arranged in the array so that at least a portion of the array is filled with valid entries, without blanks. The arrays of the key entries and their associated data are kept in perfect sequence by Insert and Remove algorithms.

The main innovations introduced by this technology include:

Surrounding the RAM structure with search logic in the RAM periphery: The number of comparator units is proportional to the RAM periphery length rather than to the RAM area. This results in significant savings in the amount of comparator logic, while keeping the memory cell extremely efficient in density and speed. The CAM implementation overhead is typically less than 15%. Therefore, the CAM density obtained with this method is asymptotically close to the comparable size in RAM technology.

Fast Search Algorithm: The surrounding logic in conjunction with the RAM structure performs searches with the same throughput as a comparable RAM, and twice the latency. Although, in theory, single clock latency may be accomplished, pipelining may yield a better throughput and a similar latency if measured on an absolute time scale (nano-seconds).

Continuous "Housekeeping" Procedure: Unlike CAMs of the prior art, these CAM devices keep the "house in order". That is, the deletion of keys does not leave "holes" in the list, which would otherwise require "housekeeping" operations on the managing processor section. Similarly, the addition of new keys keeps the list in a perfect sequence. This "housekeeping" procedure takes longer than the search, but is much faster than required by the system. The overhead associated with the Key List update is significantly shorter when compared with the time taken by the processor to do the housekeeping. This superior performance is due to the efficient RAM and Insert/Remove hardware architecture, which execute very time-efficient algorithms.

In a co-pending application, U.S. patent application Ser. No. 09/779,941, which is incorporated by reference for all purposes as if fully set forth herein, a method and apparatus are disclosed for arranging and storing a set of key entries and a corresponding set of associated data entries in storage areas within a memory device. Each location in the first storage area is assigned a unique index and is associated with the corresponding location to second storage area with the same index. Each key entry represents a range of consecutive values and is denoted herein as Range Key Entry. The range may be represented by its lower or upper boundary.

When a key is submitted for search and is found to belong to a range represented by a range key entry, the associated data entry with the same index is extracted from the memory as valid data and a Match signal is issued. If no range is found to contain the submitted key, no valid associated data is retrieved and a No-Match signal is issued.

In a co-pending, unpublished PCT Patent Application Serial No. IL01/01 025, which is incorporated by reference for all purposes as if fully set forth herein, RAM-based technology is implemented on an RCAM in a somewhat analogous fashion to the above-described implementation of RAM-based technology on a binary CAM. A method and apparatus are disclosed therein for the high-rate arrangement, storage of ranges of integers, and extraction of data associated with these ranges in a two-dimensional memory array. The two-dimensional array, which consists of memory cells, is arranged in rows and columns, each of the key entries (representing range boundaries) in these cells having a unique pair of indices that indicate the key entry location in the array. The associated data entries that correspond uniquely to these ranges are stored in another two-dimensional array under the same pair of indices. When a submitted key is searched and found within an integer range, the associated data is retrieved from the corresponding cell in the other two-dimensional associated-data memory array.

The RCAM optionally includes a third two-dimensional array, consisting of associated boundary type entries that also correspond uniquely to these ranges and are stored under the same pair of indices. These entries determine the validity of the corresponding ranges. A match signal, "True" or "False", is output accordingly with the retrieved associated data entry to indicate whether the matched range and the associated data are valid or not. The array of associated boundary type entries can be stored in conjunction with that of associated data entries or separately.

The key entries in the two-dimensional array are arranged, each entry in a separate cell, in rows or columns, in a subsequent ascending or descending order. The entries are arranged in the array so that at least a portion of the array is filled without blanks with valid entries.

The technologies (both Binary CAM and RCAM) disclosed by the above-mentioned applications are characterized by fixed-width key entries. For example, RCAM key entries consisting of 32 bits provide a very efficient way of storing address ranges in Classless Inter Domain Routing (CIDR) used in Internet Protocol Version 4 (IPv4), the currently used IP version.

It would, however, be highly desirable and of further advantage to have a device for, and a method of significantly improving the efficiency and flexibility in the storage and key search operations, by enabling the use of key entries with different widths and types to be efficiently stored in contiguous locations. It would be of even further advantage to have such a system and method adapted for the efficient storage of address ranges in the CIDR used in the new IPv6 protocol.

SUMMARY OF THE INVENTION

The Variable Key Type Search Engine of the present invention is based on a method and apparatus that enable the use of key entries having different widths and types. Each key entry is composed of a pre-selected number of key fields, and each key field consists of two fixed-width fields: a tag field and a key data field. The tag field indicates the number of key fields that are included in the respective key entry and whether the key data field corresponds to a single integer (like a key entry in a Binary CAM) or to a range of integers (like a key entry in an RCAM). The tag field value also determines the sequential order of the key entries in the list or array, so that key entries of different types may be placed in separate, but preferably contiguous, blocks within the key array. The use of classification tags thus provides great efficiency and flexibility in the storage and key search operations in a single array.

Using this approach, groups of four 32-bit key data fields can be used for efficient storage of address ranges in CIDR used in the new IPv6 protocol.

Thus, according to one aspect of the present invention, there is provided a system for storing arranged data in a memory, and for extracting the data therefrom, the system including: (a) a random access memory (RAM) including: (i) a first array of cells, the first array having at least two dimensions and having rows and columns, the first array designed and configured to contain a plurality of at least two kinds of key entries, each of the cells having a unique address and being accessible via an input key, each of the kinds of key entries being arranged in monotonic order, and (ii) a second array of cells, the second array having at least two dimensions and having rows and columns, the second array having a plurality of data entries, each of the data entries being associated with a particular one of the key entries, and (b) processing means designed and configured to search, in response to the input key, the plurality of key entries so as to identify a match.

According to further features in the described preferred embodiments, the at least two kinds of key entries include a range type key entry, each range type key entry corresponding to a particular range and being associated with a particular one of the data entries.

According to still further features in the described preferred embodiments, the at least two kinds of key entries include an exact type key entry, each exact type key entry being associated with a particular one of the data entries.

According to still further features in the described preferred embodiments, the at least two kinds of key entries include range type key entries of differing length, each of the range type key entries corresponding to a particular range and being associated with a particular one of the data entries.

According to still further features in the described preferred embodiments, the at least two kinds of the key entries include exact type key entries of differing length, each of the exact type key entries being associated with a particular one of the data entries.

According to still further features in the described preferred embodiments, the at least two kinds of the key entries include a range type key entry and an exact type key entry, each range type key entry corresponding to a particular range and being associated with a particular one of the data entries, each exact type key entry being associated with a particular one of the data entries.

According to still further features in the described preferred embodiments, at least two of any of the keys are of differing length.

According to still further features in the described preferred embodiments, the range type key entry contains a single range-boundary value.

According to still further features in the described preferred embodiments, each of the key entries includes a tag field for differentiating between the kinds of the key entries.

According to still further features in the described preferred embodiments, each of the key entries includes at least one key field including a key data field and a tag field for differentiating between the kinds of the key entries, and wherein the processing means are designed and configured to search the plurality of the key entries by adding bits of the tag field to bits of the key data field to form a single binary number.

According to still further features in the described preferred embodiments, each of the key entries includes a plurality of key fields including a plurality of key data fields and at least one tag field for differentiating between the kinds of the key entries, and wherein the processing means are designed and configured to search the plurality of the key entries by adding bits of the tag field to bits of the key data fields to form a single binary number.

According to still further features in the described preferred embodiments, each of the key entries includes at least one key field including a key data field and a tag field for differentiating between the kinds of the key entries, and wherein the processing means are further designed and configured to add at least one bit of the tag field to bits of the key data field to form a single binary number for use in the search.

According to still further features in the described preferred embodiments, each of the key entries includes a tag field for differentiating between the kinds of the key entries, each tag field having a tag field value, and wherein the processing means are further designed and configured to position a particular one of the key entries within the first array, based on the tag field value.

According to still further features in the described preferred embodiments, each of the key entries includes a tag field for differentiating between the kinds of the key entries, each tag field having a tag field value, and wherein the processing means include identification means for identifying, within the first array, a row that may contain a match between a particular one of the key entries and the input key, based on the tag field value.

According to still further features in the described preferred embodiments, the identification means for identifying a row within the first array include at least one comparator.

According to still further features in the described preferred embodiments, the identification means further include a column locator for comparing contents of the row with the input key so as to identify a column containing a match for the input key.

According to still further features in the described preferred embodiments, the column locator includes at least one comparator.

According to still further features in the described preferred embodiments, the tag field is disposed in relation to the key field such that at least one most significant bit (MSB) position is occupied by at least one bit of the tag field.

According to a second aspect of the present invention, there is provided a method for storing arranged data in a memory, and for extracting the data therefrom, the method including the steps of: (a) providing a system including: (i) a random access memory (RAM) including: (A) a first array of cells for storing key entries, the first array having at least two dimensions and having rows and columns, each of the cells having a unique address and being accessible via an input key, and (B) a second array of cells, the second array having at least two dimensions and having rows and columns, the second array having a plurality of data entries, each of the data entries being associated with a particular one of the key entries, and (ii) processing means associated with the RAM, and (b) storing at least a first kind and second kind of the key entries within the first array.

According to further features in the described preferred embodiments, the at least a first kind and second kind of key entries are arranged in monotonic order.

According to still further features in the described preferred embodiments, the first kind of key entries is arranged in a first block of cells within the first array, and the second kind of key entries is arranged in a second block of cells within the first array.

According to still further features in the described preferred embodiments, the blocks of cells are arranged in a substantially contiguous fashion.

According to still further features in the described preferred embodiments, the method further includes the step of: (c) searching, in response to the input key, a plurality of key entries so as to identify a match.

According to still further features in the described preferred embodiments, the at least one kind of key entries is a range type key entry.

According to still further features in the described preferred embodiments, the at least one kind of key entries is an exact type key entry.

According to still further features in the described preferred embodiments, the at least one kind of key entries is an exact type key entry.

According to still further features in the described preferred embodiments, each of the key entries includes a tag field.

According to still further features in the described preferred embodiments, each of the key entries includes a tag field and a key data field, and wherein the searching includes differentiating between the kinds of key entries.

According to still further features in the described preferred embodiments, the tag field and the key data field are examined as a single binary number in step (c).

According to still further features in the described preferred embodiments, the first kind of key entries is arranged in a first block of cells within the first array, and the second kind of key entries is arranged in a second block of cells within the first array.

According to still further features in the described preferred embodiments, the searching includes identifying a matching kind of the key entries using the tag field.

According to still further features in the described preferred embodiments, the searching includes identifying a row within the first array in which a key entry matching the input key may be disposed.

According to still further features in the described preferred embodiments, the searching includes identifying a row within the first array in which the input key may fall within a particular range associated with a range type key entry.

According to still further features in the described preferred embodiments, the searching includes disposing the tag field in relation to the key field such that at least one most significant bit (MSB) position is occupied by at least one bit of the tag field.

According to still further features in the described preferred embodiments, the storing of the key entries includes varying a length of the tag field according to a predetermined criterion, so as to reduce a number of the cells occupied by the tag field.

According to still further features in the described preferred embodiments, the method further includes disposing the tag field in a most significant bit (MSB) position.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a schematic illustration of a two-dimensional, M-column by N-row, memory array;

Figure 9:
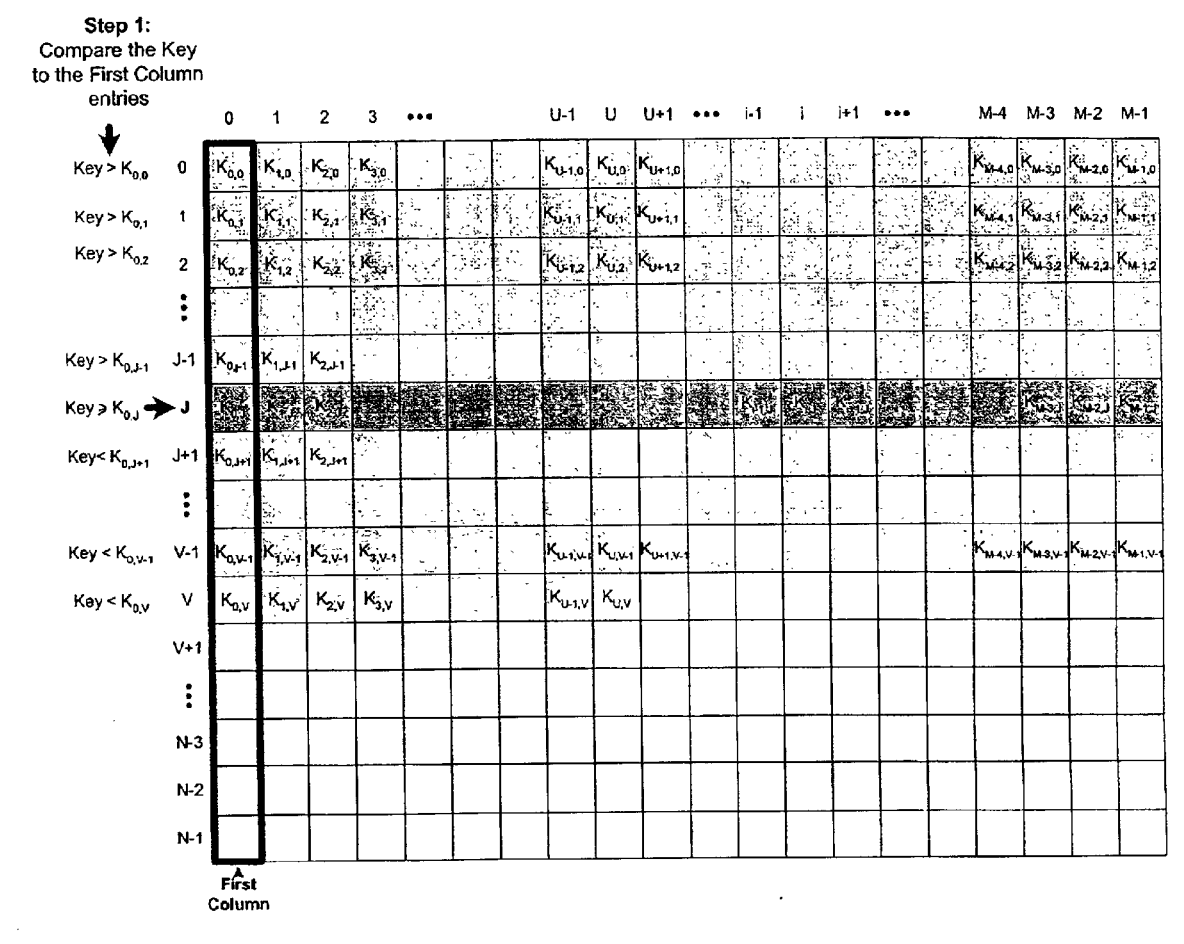

FIG. 9 illustrates step 1 (Row Location) in a Sequential Key Search in a TDA, and FIG. 10 illustrates step 2 (Column Location) in a Sequential Key Search in a TDA.

DESCRIPTION OF THE PREFERRED EMBODIMENTS

Figure 2:
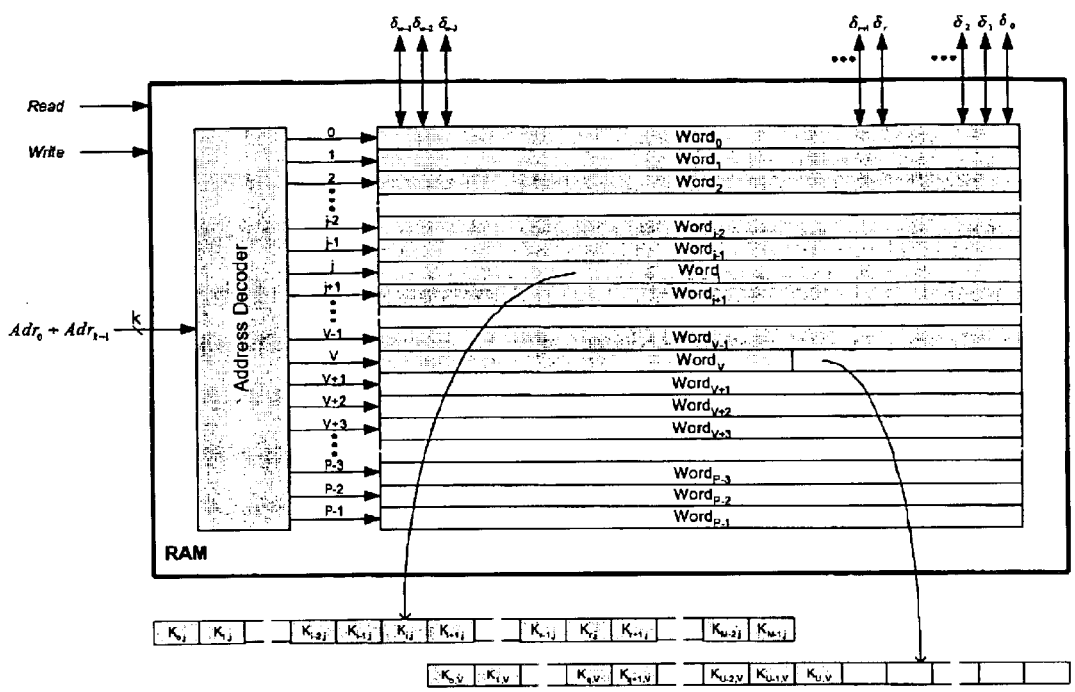
FIG. 2 is a schematic illustration of key mapping in a conventional RAM of the prior art.

The principles of the variable-key type search system for, and variable-key type search method of, implementing a Random Access Memory (RAM)-Based Binary CAM and a RAM-Based Range Content Addressable Memory (RCAM), according to the present invention, may be better understood with reference to the drawings and the accompanying description.

Before explaining at least one embodiment of the invention in detail, it is to be understood that the invention is not limited in its application to the details of construction and the arrangement of the components set forth in the following description or illustrated in the drawing. The invention is capable of other embodiments or of being practiced or carried out in various ways. Also, it is to be understood that the phraseology and terminology employed herein is for the purpose of description and should not be regarded as limiting.

1. RAM-Based Binary CAM or RCAM—Basic Concepts

One basic concept underlying the RAM-Based Binary CAM or RAM-Based RCAM is maintaining an ordered key list. This means that the key entries are stored in such a way that:

The key entries are positioned contiguously in either an ascending or descending order in a multi-dimensional memory array The empty locations in the memory array are contiguous, and may either follow or precede the occupied locations, with a uniquely defined transition point between the last occupied location and the first empty location, or vice versa The block of occupied locations may either start at the first memory address or end in the last memory array address Although the RAM-Based Binary CAM or RCAM may be implemented using any of the alternatives described above, we shall limit our discussion to the following exemplary cases:

The key entries are stored in contiguous ascending order in two-dimensional arrays (TDAs)

The key list starts at the lowest memory array address

The block of empty positions follows the key list

Figure 1:
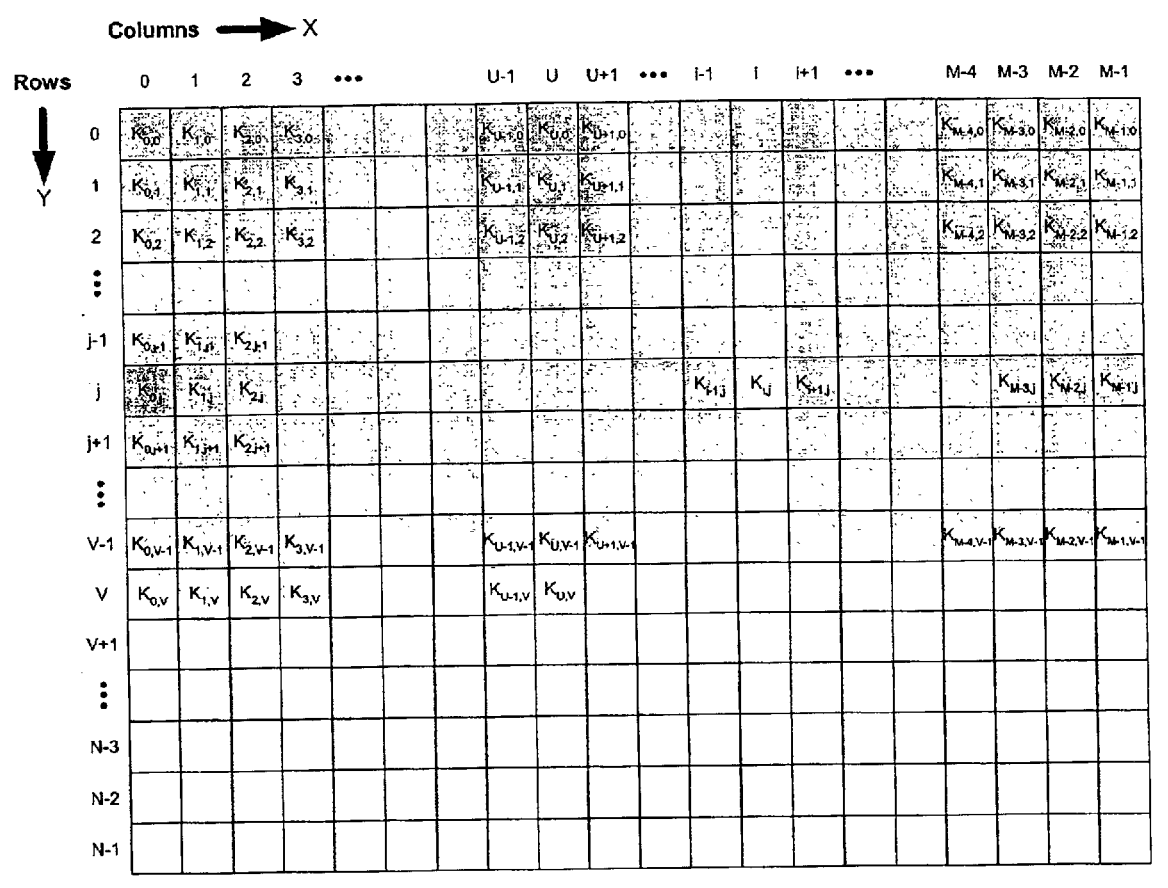

FIG. 1 depicts a TDA of M columns by N rows. The rows are sequenced from top to bottom and indexed with an integer index j, where $0 \leq j \leq N-1$. The columns are sequenced from left to right and indexed with an integer index i, where $0 \leq i \leq M-1$. The occupied key entry locations are shadowed with light gray. The empty locations are blank. A key located in column i and row j has an integer value Ki,j. The lowest key value $K_{0,0}$ resides in row 0 and column 0. The highest key value $K_{U,V}$ resides in row V and column U.

The TDA parameters are:

b: Key data width

M: Number of TDA columns, or number of b-bit wide key words in a TDA row

N: Number of TDA rows

U: Last key entry column

V: Last key entry row j: Key row index, $0 \leq j \leq V$ i: Key column index, $0 \leq I \leq M-1$ for $j < V$ and $0 \leq I \leq V$ for $j = V$ The RAM organization is depicted in FIG. 2.

The RAM parameters are:

w: Width of the RAM word and of the RAM data bus $\delta_0 - \delta_{w-1}$: RAM word bus, where $\delta_0$ is defined as the word rightmost bit, and $\delta_{w-1}$, is the word leftmost bit P: Number of w-bit wide words in the RAM $Adr_0 - Adr_{k-1}$: k-bit wide RAM address bus Then, each w-bit wide RAM word contains M key words, that is, $$w = M \cdot b$$

Figure 3:
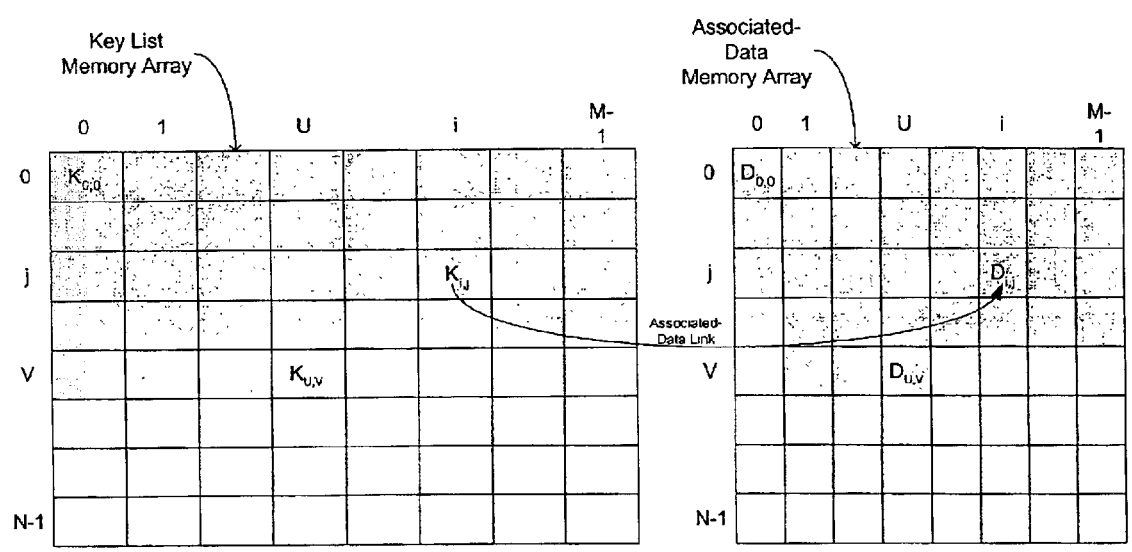
FIG. 3 is a schematic illustration of the correspondence between the two-dimensional key list and the associated data list for a binary CAM.

The RAM-Based Binary CAM contains two TDAs or lists, a key list and an associated data list. Each key entry $K_{i,j}$ has a corresponding associated data entry $D_{i,j}$, as depicted in FIG. 3. Since the Binary CAM stores an ordered list of single integer keys, a key search in results in an exact match and a straightforward access to the corresponding associated data.

Figure 4:
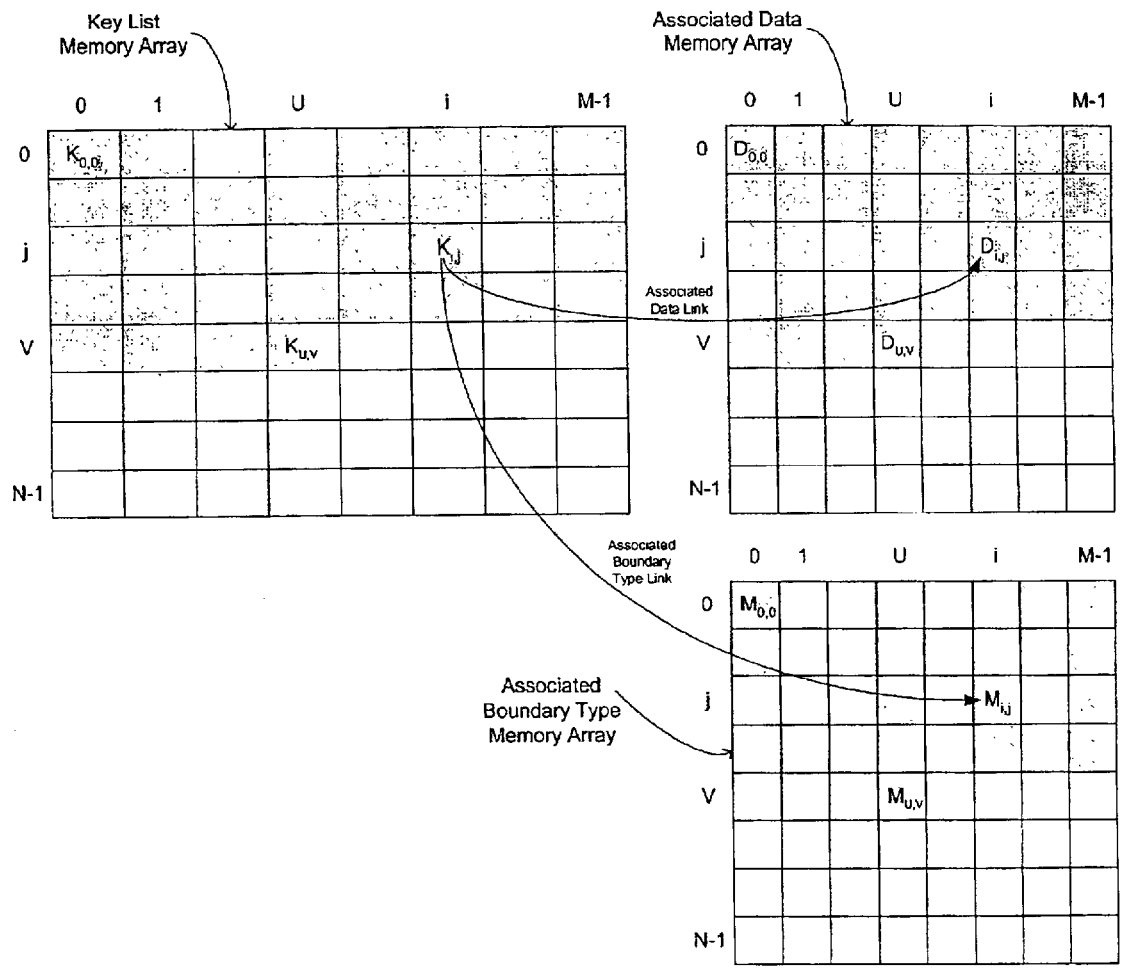
FIG. 4 is a schematic illustration of the correspondence between the two-dimensional key list, the associated data list and the associated boundary type list.

The RAM-Based RCAM includes additionally an associated boundary type list, where each associated boundary type entry $M_{i,j}$ corresponds to the key entry $K_{i,j}$ as shown in FIG. 4. The RCAM stores a list of key entries that represent boundaries of associative ranges, so that a key search results in a matching range, and the retrieval of the associated data and boundary type that corresponds uniquely to this range. The associated boundary type determines the validity of the matching range and the associated data.

The entries of the key list, associated data list and associated boundary type list (for an RCAM) are always kept in a compact and sequential form (monotonically increasing or decreasing), and perfect correspondence, by means of efficient Insert and Remove algorithms.

2. Variable Key Type Search Engine—Basic Architecture and Operations

One basic component that promotes the flexibility and efficiency of the inventive Variable Key Type Search Engine is a tag field indicator for indicating:

1) the number of key fields (tag plus key data fields) included in each respective key entry, and 2) the type of key data field (a single integer as in a Binary CAM, or a range of integers as in an RCAM).

The tag field value is also used to determine the sequential order of the key entries in the list or array, so that key entries of different types may be placed in separate but contiguous blocks within the key array. Various arrangements may be apparent to those skilled in the art. For example:

The key entries may be arranged in contiguous blocks of either increasing or decreasing width, which depends on the number of key fields in a key entry. A compact arrangement requires starting either with the largest key entries at the first array index (0,0) for decreasing width or at the last array index (M-1, N-1) for increasing width. In either case, the number of bits of any key entry, except the smallest key entry (one key field), must be a multiple of the number of bits of the contiguous smaller key entry.

The key entries may be arranged according to their types of key data field (a single integer leading to an exact match or a range of integers leading to a matching range).

A general requirement, regardless of the type of arrangement, is that the width of the key entries must be pre-selected considering the width of the RAM word, so that the key entries fill exactly every row of the TDA.

Although the Variable Key Type Search Engine may be implemented in any of the alternatives described above, we shall discuss the following case:

The key entries are arranged in contiguous blocks of decreasing width starting with the largest key entries at the first array index (0,0).

Each key entry may contain 1, 2 or 4 key fields of 36 bits. Each 36-bit key field consists of a 4-bit tag field and a 32-bit key data field.

Figure 5:
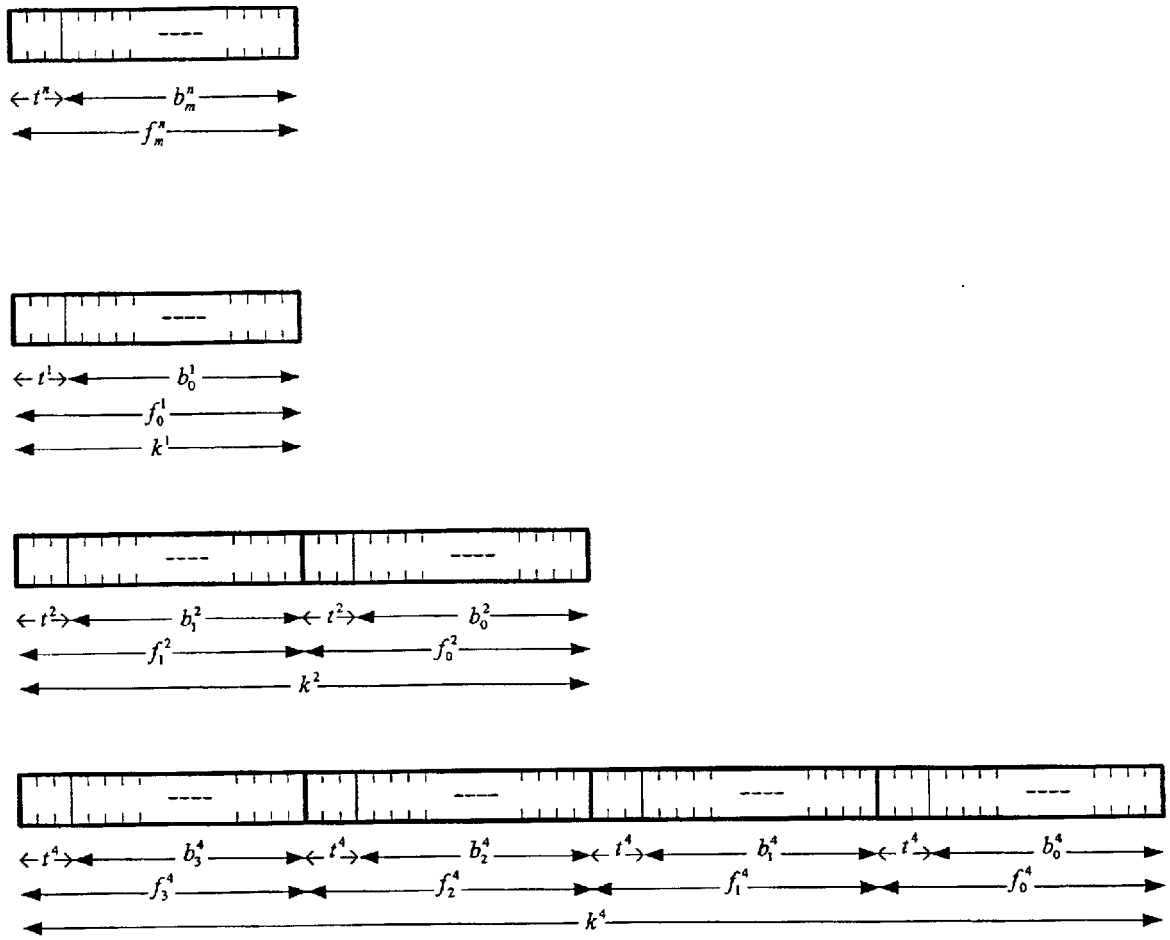
FIG. 5 illustrates a generic key field and three key entries containing 1, 2 and 4 key fields, respectively.

FIG. 5 depicts a generic key field and then three key entries containing 1, 2 and 4 key fields. The data provided in a key entry with several key fields is distributed in the key data fields with the most significant bits (MSBs) in the leftmost key field and the least significant bits (LSBs) in the rightmost key field. The tag fields are identical for all the key fields in the same key entry.

Figure 6:
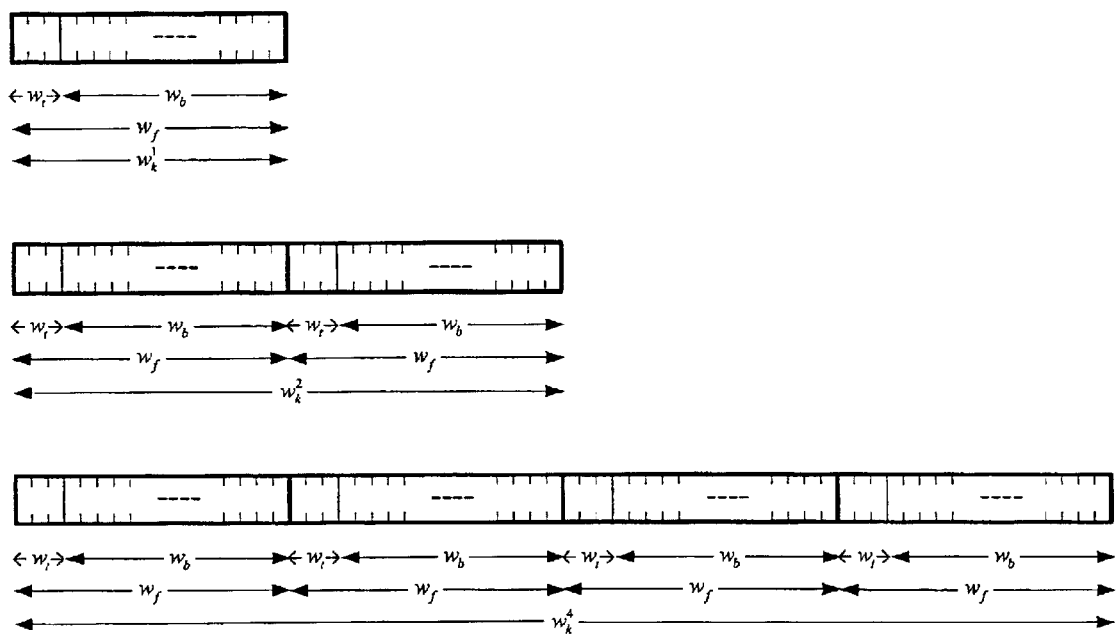
FIG. 6 illustrates width relations of the three key entries provided in FIG. 5.

The key entry parameters are:

n: Number of key fields in a key entry $k^n$: Key entry with n key fields m: Number that indicates the position of each key field in a key entry, starting from zero for the field with the LSB $f_m^n$: Key field in position m in key entry $k^n$ $t^n$: Tag field in key entry $k^n$. This parameter is identical for all the key fields in the same key entry, and therefore is independent of m $b_m^n$: Key data field in position m in key entry $k^n$ FIG. 6 depicts the width relations of three key entries containing 1, 2 and 4 key fields. The width parameters of the key entry and key field are:

$w_k^n$: Width of a key entry with n key fields $w_f$: Key field width $w_t$: Tag field width $w_b$: Key data field width The width or number of bits of a key field is the sum of the number of bits of its tag and key data fields:

$$w_f = w_t + w_b$$

The widths of the key field, tag field and key data field, $w_f$, $w_t$ and $w_b$, respectively, are fixed.

The number of bits in a key entry is a multiple of the number of bits in its key fields:

$$w_k^n = n \cdot w_f = n \cdot (w_t + w_b)$$

Since the key entries must fill every TDA row (corresponding to a RAM word), the number of bits n of any key entry, except the smallest key entry (for a one key field), must be a multiple of the number of bits of the contiguous smaller key entry, and the sum of bits of all the key entries in every row must equal the RAM word width:

$$w = \sum_{i=1}^{K} w_k^n(i) = w_f \cdot \sum_{i=1}^{K} n_i = (w_t + w_b) \cdot \sum_{i=1}^{K} n_i$$

where w is the width of the RAM word, K is the number of key entries in a row and $n_t$ is the number of key fields in a specific key entry.

If all the key entries in a row have the same number n of key fields, then:

$$w = K \cdot w_k^n = K \cdot n \cdot w_f = K \cdot n \cdot (w_t + w_b)$$

Thus, since $w_k^n$ is a multiple of the number of bits in any key fields, including the largest key entry, the total number of bits in a row is clearly a multiple of the number of bits in the largest key entry.

Figure 7:
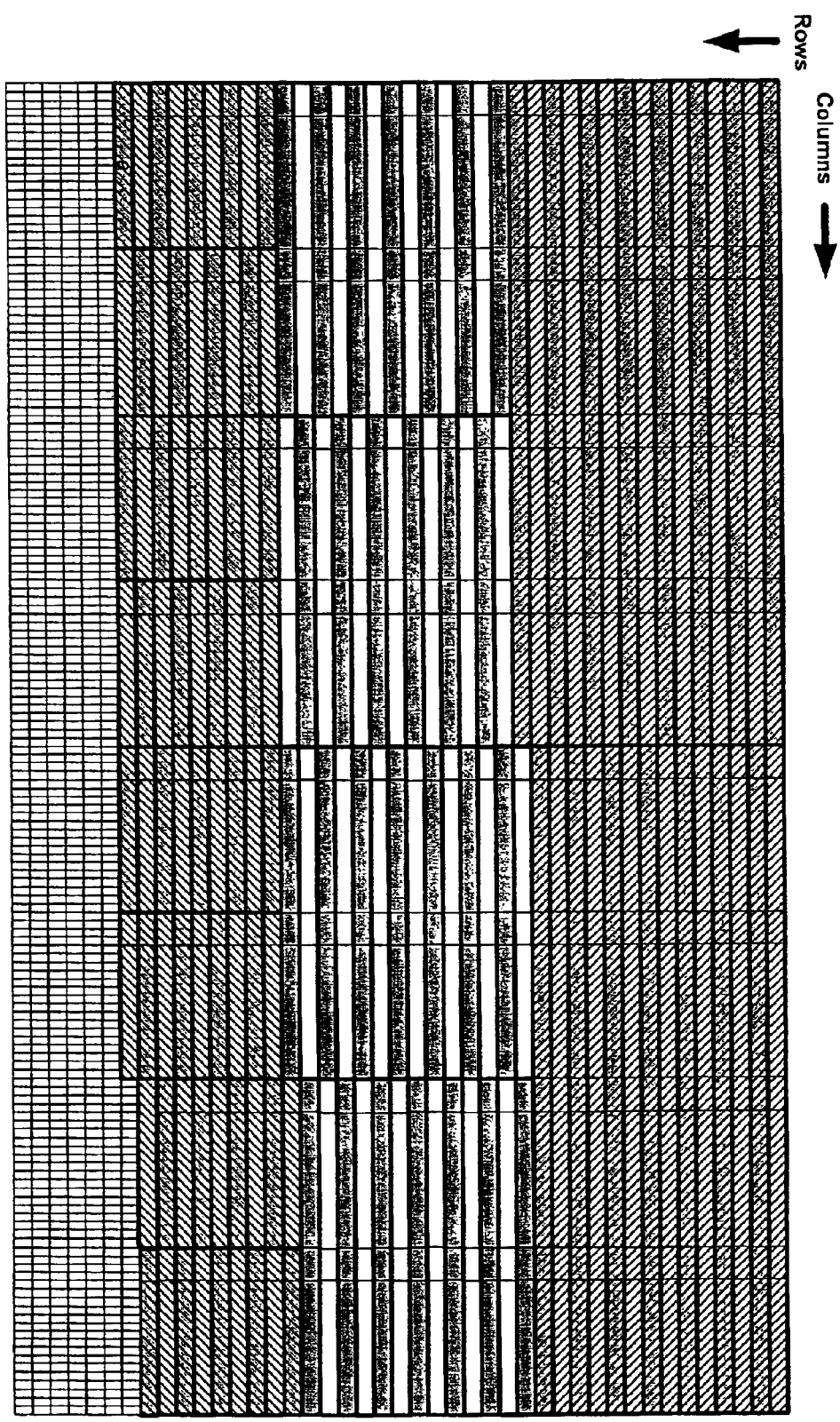
FIG. 7 illustrates a two-dimensional array, partially filled with contiguous blocks of key entries of decreasing width.

FIG. 7 depicts a TDA partially filled with contiguous blocks of key entries of decreasing width starting with the largest key entries at the first array index (0,0). The key entries in these blocks contain 4, 2 and 1 key fields, and are shown in alternate gray and white colors, and with different filling patterns for the key entries with different widths.

The width of each key entry, which depends on the number of key fields integrated in it, is determined by the two more significant bits of the tag field. Since, in this particular example, the values of the RSE key entries are stored in ascending order, the more significant bits of the tag field must be specified so that larger key entries are represented by smaller numbers. (If the TDA were arranged with contiguous blocks of key entries of increasing width, the more significant bits of the tag field would be specified so that smaller key entries are represented by smaller numbers).

The LSB of the tag field indicates whether the key data field corresponds to a single integer (leading to an Exact Match in a Binary CAM) or to a range of integers (leading to a Range Match in an RCAM). In this way, the key entries of the same width are grouped according to their type. Within these groups, the key entries are stored in contiguous ascending order according to the values of the key data fields starting from their MSBs.

Thus, this tagging method allows, by storing contiguous blocks of key entries in ascending order, a Search operation for lookups, and Insert and Remove operations for the maintenance of the TDA in order, using the same procedures as in RAM-Based Binary CAMs and RAM-Based RCAMs described in PCT Patent Application Serial No. IL01/00458 and PCT Patent Application Serial No. IL01/01025, respectively.

In a preferred implementation, the structures of the Associated Data TDA and Associated Boundary Type TDA (for RAM-Based RCAM) correspond identically to that of the Key TDA. In this case, when a key entry is composed of more than one key field, the corresponding associated data entry and the associated boundary type entry (for RAM-Based RCAM) are also composed of the same number of fields; however, these fields contain data only and no tags. All the fields in the associated data and boundary type entry can be used to store data; if only one field suffices, the field corresponding to the more significant bits may be used.

If all the key entries in a device are known to have the same length, an alternative implementation may be used with the associated data and associated boundary type entries having each one data field only.

The storage of Ipv4 CIDR, Multicast and IPv6 CIDR addresses requires 32, 64 and 128 bits, respectively. Key entries with 1, 2 and 4 key data fields of 32 bits can be used for this purpose. If 32 bits are assigned to the key field and 3 bits to the tag field, then a field key consists of 35 bits, because:

$$w_b = 32$$

$$w_t = 3$$

$$w_f = w_t + w_b = 35$$

Key entries with 1, 2 and 4 field keys, consisting of 35, 70 and 140 bits, respectively, can be used to store Ipv4, Multicast and IPv6 CIDR addresses:

$$w_k^1 = 1 \cdot w_f = 35 \text{ for Ipv4 CIDR}$$

$$w_k^2 = 2 \cdot w_f = 70 \text{ for Multicast addresses}$$

$$w_k^4 = 4 \cdot w_f = 140 \text{ for IPv6 CIDR addresses}$$

In order to fill a TDA row, the RAM word width must be a multiple of the number of bits in the largest key entry, i.e., a multiple of 140. Thus, any RAM having words with a number of bits equal to 140, 280, 420, 560, etc., can serve for this purpose.

As an example, a single Range Search Engine (RSE) or multiple RSEs integrated into a single Forwarding Information Base (FIB) implemented with such RAMs can be used to store six key types several key types:

140-bit Range Type Keys
140-bit Exact Type Keys
70-bit Range Type Keys
70-bit Exact Type Keys
35-bit Range Type Keys
35-bit Exact Type Keys This selection requires only a 3-bit tag field, which provides up to $2^3=8$ key types. Table 1 shows an optional way of tagging the six key types listed above. Two bits are used for the Tag Length (TGL) and one for the Exact/Range selection. The two unused combinations TGL=00, E/$\overline{\text{R}}$=0 and 1, can provide additional selections.

TABLE 1

Tagging of Six Key Types

| TGL | E/R | Key Type |
|-----|-----|----------|
| 01 | 0 | 140-bit, Range Type |
| 01 | 1 | 140-bit, Exact Type |
| 10 | 0 | 70-bit, Range Type |
| 10 | 1 | 70-bit, Exact Type |
| 11 | 0 | 35-bit, Range Type |
| 11 | 1 | 35-bit, Exact Type |

Assume, by way of example, that the 32-bit binary number 00110011011110000000011110000000 is stored in a Key TDA, first as the key data of the fourth key field (the one with the less significant bits) in a 140-bit Range Type Key, then as the key data of the second key field in a 70-bit Range Type Key and finally as the sole key data field of a 35-bit Exact Type Key. The tag field, composed of two TGL bits followed by one E/$\overline{\text{R}}$ bit, as shown in Table 1, is 010 for the 140-bit Range Type Key, 100 for the 70-bit Range Type Key, and 111 for the 35-bit Exact Type Key.

Thus, when the 32-bit number 00110011011110000000011110000000 is stored as the fourth key data field in a 140-bit Range Type Key, the 3 bits 010 appear in the tag field, so that the fourth key field consists of 010+00110011011110000000011110000000. The other three key fields in the 140-bit Range Type Key include each the same tag field 010 but different 32-bit numbers as key data fields. The tag fields of the three less significant key fields are redundant and disregarded when the key fields are integrated into a single number for search and maintenance operations (to keep the Key List in order); this number consists of one tag field followed by four key data fields, i.e., in this example it includes 3+32×4=131 bits.

When the 32-bit number 00110011011110000000011110000000 is stored as the second key data field in a 70-bit Range Type Key, the 3 bits 100 appear in the tag field, so that the second key field consists of 100+00110011011110000000011110000000. The other key field in the 70-bit Range Type Key includes the same tag field 100 but a different 32-bit number as a key data field. The tag fields of the less significant key field is redundant and disregarded when the key fields are integrated into a single number for search and maintenance operations; this number consists of one tag field followed by four key data fields, i.e., in this example, it includes 3+32×2=67 bits.

When 00110011011110000000011110000000 is stored as the key data field in a 35-bit Exact Type Key, the 3 bits 111 appear in the tag field, so that the sole key field (and the entire 35-bit Exact Type Key) consists of 111+00110011011110000000011110000000, i.e., 3+32=35 bits.

Figure 8:
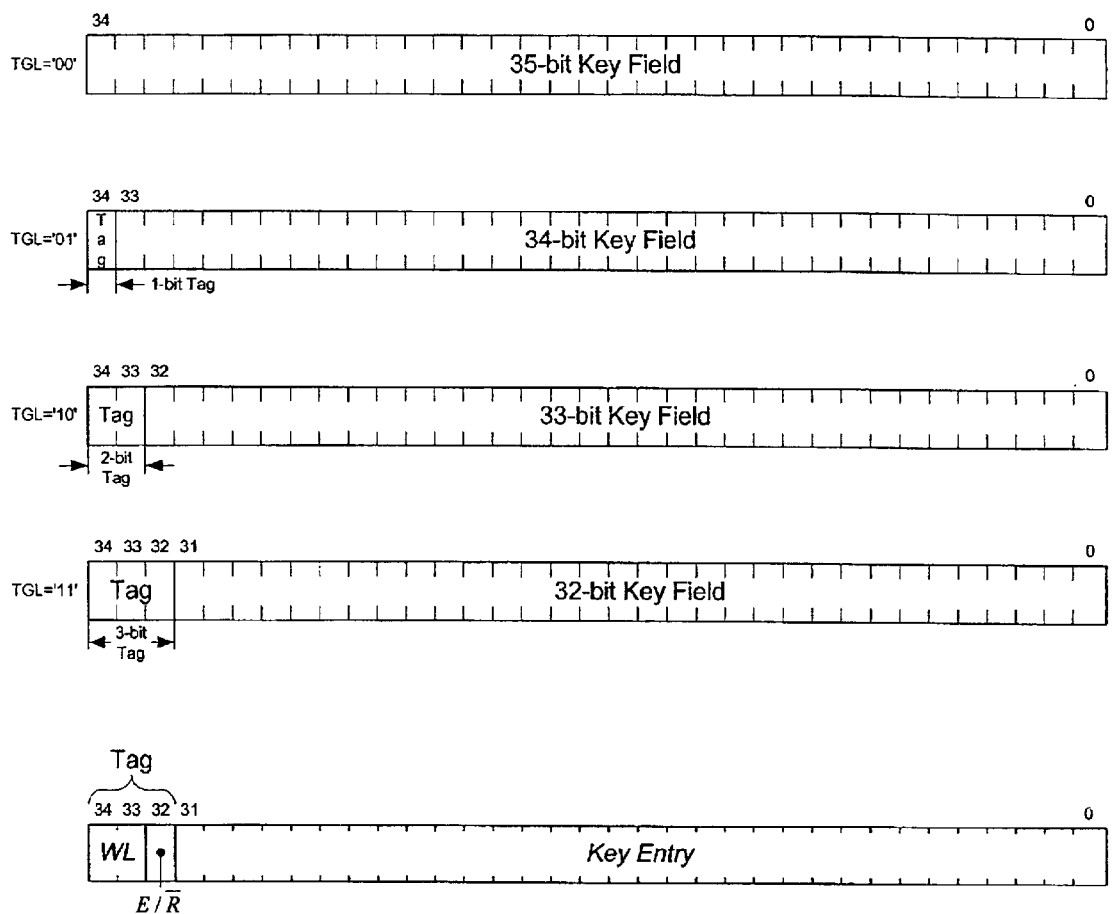
FIG. 8 provides examples of tag fields in a key entry word and structure of a three-bit tag field.

Another optional method that provides great flexibility uses tags of a variable length, from 0 to 3 bits, that occupy the most significant bit positions in every key entry word. In this arrangement, the Tag Length (TGL) configuration field defines the number bits included in the tag field, as shown in FIG. 8; the longer the tag field, less bits are available for the key data. The key field shown consists of 35 bits. As the the tag field width increases from 0 to 3 bits, the key data field width decreases from 35 to 32 bits. The key entry shown at the bottom of the figure consists of one key field. The 3-bit tag field conforms with the tagging method shown in Table 1. The 32-bit key data field can be used to represent an IPv4 address.

Key Search in the Key List

When a key is submitted for a search (lookup), its tag field, determined by its predefined length and type, is added to the key data field (or fields) as described above; then, integrated as one key with one or more fields, the submitted key is searched in the Key TDA, in the same way as a single-field key is searched in a TDA with untagged single-field key entries. The search procedure for the RAM-Based Binary CAMs and RAM-Based RCAMs is described below.

Two-Step Search Algorithm

A sequential search of the submitted key (Key Search) in the TDA can be completed in two steps:

Step 1: Identification of the TDA row where the submitted key may be located, as illustrated in FIG. 9. This step is identical for Binary CAMs and RCAMs.

Figure 10:
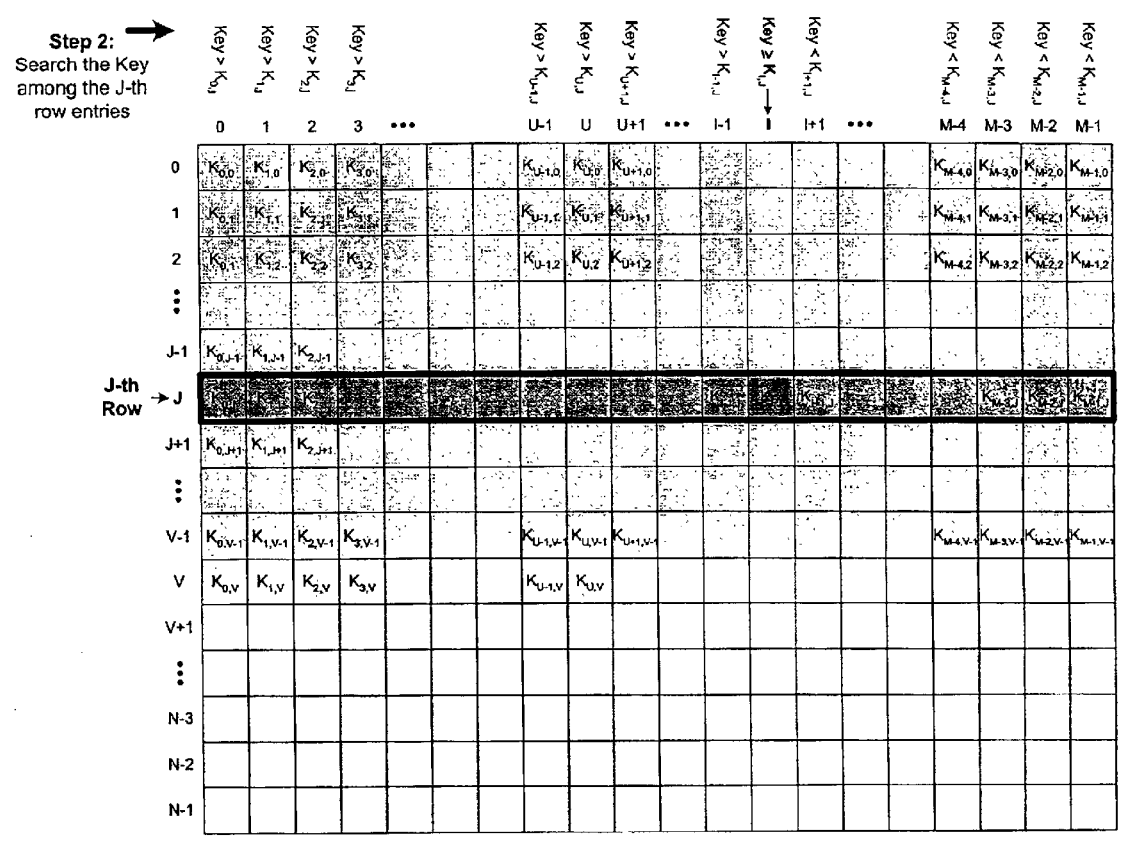

Step 2: Access to the row identified in Step 1 and lookup of the submitted key, to find an exact match (for a Binary CAM) or a range match (for an RCAM), as illustrated in FIG. 10. This step is different for Binary CAMs and RCAMs.

Prior to the Key Search in the Key List, the submitted key K is compared with the Key List values in the first and last locations. If $K<K_{0,0}$ or $K>K_{U,V}$, the search is concluded, as the key is not included in the Key List.

If $K_{0,0} \leq K \leq K_{U,V}$, the key is potentially listed in the Key List. In this case, the search procedure can start with Step 1.

The Search procedures essentially identical to those used in RAM-Based Binary CAMs and RAM-Based RCAMs, described in PCT Patent Application Serial No. IL01/00458 and PCT Patent Application Serial No. IL01/01025, respectively.

In the serial two-step search algorithm, a new search cycle starts only after the search cycle for the previous key is completed; thus, two clocks are required for execution, such that the search is performed at half of the clock rate.

In the pipelined search algorithm, a new search cycle starts after the first step of the previous search cycle is completed, i.e., just one clock period after the start of the previous cycle; thus, search operations are performed at a full clock rate.

Keeping the Key List in Order—Insert and Remove Operations

The insertion or removal of keys demands constant updating of the Key List to keep it in order. The straightforward way to update the keys is by applying a serial and lengthy algorithm that requires sequential readout and update of all the Key List entries. The Insert and Remove procedures for the maintenance of the TDA in order are based on the fact that the TDA structure is implemented with a w-bit wide RAM. Since each RAM word consists of M keys, the Key List can be readout and written in steps of M keys.

The Insert and Remove operations are similar for RAM-Based Binary CAMs and RAM-Based RCAMs, and are described in PCT Patent Application Serial No. IL01/00458 and PCT Patent Application Serial No. IL01/01025, respectively.

As used herein in the specification and in the claims section that follows, the term "kind of key entry" and the like refer to a type of key entry such as an exact type key entry or a range type key entry, or to a key entry of a particular length. Thus, an exact type key entry and a range type key entry are defined to be two kinds of key entries, and a 35-bit exact type key entry and a 140-bit exact type key entry are also defined to be two kinds of key entries. The key entry typically includes a key field and a tag field that characterizes the length and/or type of the key entry.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications mentioned in this specification are herein incorporated in their entirety by reference into the specification, to the same extent as if each individual publication was specifically and individually indicated to be incorporated herein by reference. In addition, citation or identification of any reference in this application shall not be construed as an admission that such reference is available as prior art to the present invention.

What is claimed is:

1. A system for storing arranged data in a memory, and for extracting the date therefrom, the system comprising:
    (a) a random access memory (RAM) including:
        (i) a first array of cells, said first array having at least two dimensions and having rows and columns, said first array designed and configured to contain a plurality of at least two kinds of key entries, wherein the at least two kinds of key entries are selected from one of: two exact type of key entries with different lengths, two range type of key entries with different lengths, or combination of an exact type key entry and a range type of key entry; each said range type key entry corresponding to a particular range and being associated with a particular one of said data entries; each said exact type key entry being associated with a particular one of said data entries; each of said cells having a unique address and being accessible via an input key, each of said kinds of key entries being arranged in monotonic order, and
        (ii) a second array of cells, said second array having at least two dimensions and having rows and columns, said second array having a plurality of data entries, each of said data entries being associated with a particular one of said key entries, and
    (b) processing means designed and configured to search, in response to said input key, said plurality of said key entries so as to identify a match.

2. The system of claim 1, wherein said at least two kinds of key entries include a range type key entry.

3. The system of claim 1, wherein said at least two kinds of key entries include an exact type key entry.

4. The system of claim 1, wherein said at least two kinds of key entries include range type key entries of differing length.

5. The system of claim 1, wherein said at least two kinds of said key entries include exact type key entries of differing length.

6. The system of claim 1, wherein said at least two kinds of said key entries include a range type key entry and an exact type key entry.

7. The system of claim 1, wherein at least two of any of said keys are of differing length.

8. The system of claim 2, wherein said range type key entry contains a single range-boundary value.

9. The system of claim 1, wherein each of said key entries includes a tag field for differentiating between said kinds of said key entries.

10. The system of claim 1, wherein each of said key entries includes at least one key field including a key data field and a tag field for differentiating between said kinds of said key entries, and wherein said processing means are designed and configured to search said plurality of said key entries by adding bits of said tag field to bits of said key data field to form a single binary number.

11. The system of claim 10, wherein each of said key entries includes a plurality of key fields including a plurality of key data fields and at least one tag field for differentiating between said kinds of said key entries, and wherein said processing means are designed and configured to search said plurality of said key entries by adding bits of said tag field to bits of said key data fields to form a single binary number.

12. The system of claim 1, wherein each of said key entries includes at least one key field including a key data field and a tag field for differentiating between said kinds of said key entries, and wherein said processing means are further designed and configured to add at least one bit of said tag field to bits of said key data field to form a single binary number for use in said search.

13. The system of claim 1, wherein each of said key entries includes a tag field for differentiating between said kinds of said key entries, each said tag field having a tag field value, and wherein said processing means are further designed and configured to position a particular one of said key entries within said first array, based on said tag field value.

14. The system of claim 1, wherein each of said key entries includes a tag field for differentiating between said kinds of said key entries, each said tag field having a tag field value, and wherein said processing means include identification means for identifying, within said first array, a row that may contain a match between a particular one of said key entries and said input key, based on said tag field value.

15. The system of claim 14, wherein said identification means include at least one comparator.

16. The system of claim 14, wherein said identification means further include a column locator for comparing contents of said row with said input key so as to identify a column containing a match for said input key.

17. The system of claim 16, wherein said column locator includes at least one comparator.

18. The system of claim 11, wherein said tag field is disposed in relation to said key field such that at least one most significant bit (MSB) position is occupied by said at least one bit of said tag field.

19. The system of claim 15, wherein said identification means further include a column locator for comparing contents of said row with said input key so as to identify a column containing a match for said input key.

20. A method for storing arranged data in a memory, and for extracting the data therefrom, the method comprising the steps of:
(a) providing a system including:
  (i) a random access memory (RAM) including:
    (A) a first array of cells for storing key entries, said first array having at least two dimensions and having rows and columns, each of said cells having a unique address and being accessible via an input key, and
    (B) a second array of cells, said second array having at least two dimensions and having rows and columns, said second array having a plurality of data entries, each of said data entries being associated with a particular one of said key entries, and
  (ii) processing means associated with said RAM, and
(b) storing at least a first kind and second kind of said key entries within said first array.

21. The method of claim 20, wherein said at least a first kind and second kind of key entries are arranged in monotonic order.

22. The method of claim 20, wherein said first kind of key entries is arranged in a first block of cells within said first array, and said second kind of key entries is arranged in a second block of cells within said first array.

23. The method of claim 22, wherein said blocks of cells are arranged in a substantially contiguous fashion.

24. The method of claim 20, further comprising the step of:
  (c) searching, in response to said input key, a plurality of said key entries so as to identify a match.

25. The method of claim 24, wherein said first kind of key entry is a range type key entry.

26. The method of claim 24, wherein said first kind of key entry is an exact type key entry.

27. The method of claim 25, wherein said second kind of key entry is an exact type key entry.

28. The method of claim 20, wherein each of said key entries includes a tag field.

29. The method of claim 24, wherein each of said key entries includes a tag field and a key data field, and wherein said searching includes differentiating between said kinds of said key entries.

30. The method of claim 29, wherein in step (c), said tag field and said key data field are examined as a single binary number.

31. The method of claim 29, wherein said first kind of key entries is arranged in a first block of cells within said first array, and said second kind of key entries is arranged in a second block of cells within said first array.

32. The method of claim 31, wherein said searching includes identifying a matching kind of said key entries using said tag field.

33. The method of claim 30, wherein said searching includes identifying a row within said first array in which a key entry matching said input key may be disposed.

34. The method of claim 30, wherein said searching includes identifying a row within said first array in which said input key may fall within a particular range associated with a range type key entry.

35. The method of claim 29, wherein said searching includes disposing said tag field in relation to said key field such that at least one most significant bit (MSB) position is occupied by at least one bit of said tag field.

36. The method of claim 28, wherein said storing of said key entries includes varying a length of said tag field according to a pre-determined criterion, so as to reduce a number of said cells occupied by said tag field.

37. The method of claim 36, further including disposing said tag field in a most significant bit (MSB) position.

* * * * *